Dec. 12, 1961 R. H. MOORE ET AL 3,012,432
LEAK TESTER
Filed Sept. 23, 1957
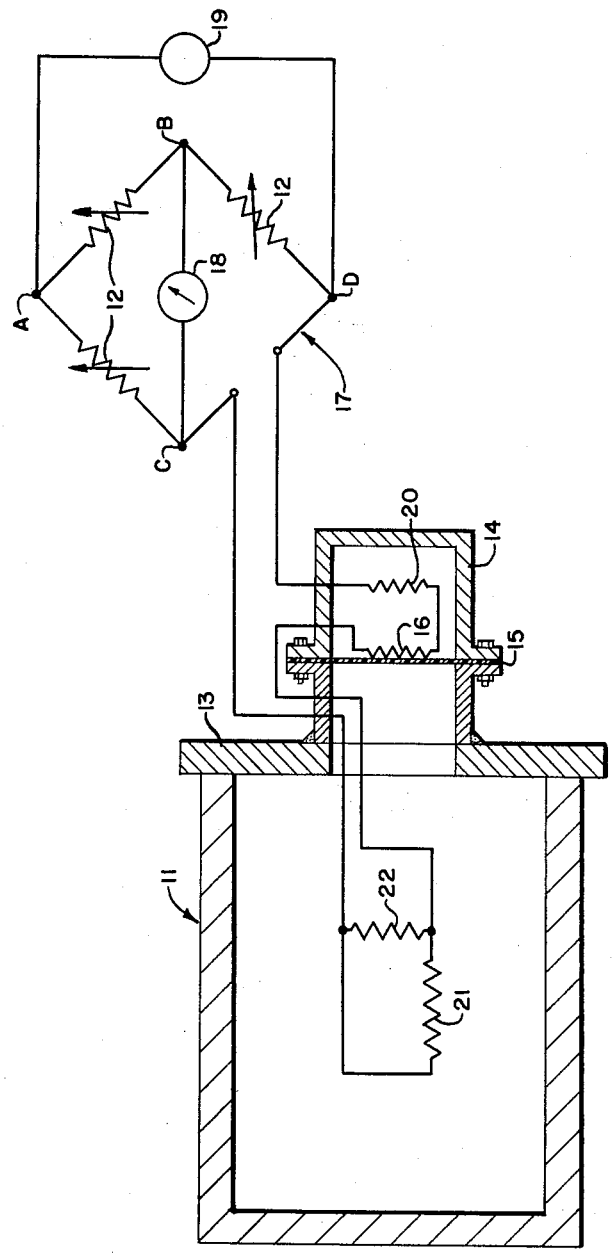
INVENTORS
R. H. MOORE
J. C. GOFF
BY
ATTYS United States Patent Office 3,012,432
Patented Dec. 12, 1961

3,012,432
LEAK TESTER
Richard H. Moore, Beltsville, and John C. Goff, Silver Spring, Md., assignors to the United States of America as represented by the Secretary of the Navy
Filed Sept. 23, 1957, Ser. No. 685,759
4 Claims. (Cl. 73—40)
(Granted under Title 35, U.S. Code (1952), sec. 266)

The invention described herein may be manufactured and used by or for the Government of the United States of America for governmental purposes without the payment of any royalties thereon or therefor.

This invention relates to pressure apparatus for testing vacuum or pressure vessels to determine the presence of minute leaks and is concerned more particularly with a novel leak detecting device which is fully compensated for temperature changes tending to introduce errors into the indicated pressure.

Pressure detectors employed for indicating leaks customarily take the form of a diaphragm subjected to the pressure within the system and a plurality of strain gages connected to form a balanced bridge circuit and secured to an appropriate face of the diaphragm so that the gages are subjected to tension or compression depending upon the face selected as the diaphragm flexes in response to the pressure variations within the system. The tension and compression alters the resistance of the gages so that the resistance bridge becomes unbalanced thereby providing an indication of the pressure increase or decrease within the system which may be equated to the amount of fluid entering or leaking from the system.

Since the response of the strain gages may be adversely affected by alterations in the ambient temperature, a compensating resistor is ordinarily incorporated into the bridge circuit to compensate for variations in the resistance of the strain gages due to temperature changes. This conventional strain gage arrangement proved to be unsatisfactory for accurate testing of pressure vessels because slight variations of the temperature of the fluid within the vessel during testing caused significant pressure changes which masked a small leak if the temperature increased a few degrees, or indicated that a good container was faulty if the temperature decreased.

Accordingly, it is an object of this invention to provide a new and improved leak detector for testing pressure vessels which is temperature compensated to prevent spurious measurements due to small variations in the internal pressure of the vessel caused by changes in temperature.

Another object is the provision of a device for indicating minute variations in the amount of fluid within a system which device is responsive only to the changes in the pressure of the system caused by variations in the amount of fluid within the system and is insensitive to changes of temperature.

These and many other objects will become more readily apparent when the following description is read in conjunction with the accompanying drawing which is a representation of the circuit of the instant invention.

As seen in the drawing, a typical pressure vessel 11 to be tested has a mouth to which a testing cap or closure 13 is secured in sealing relation when it is desired to test the vessel 11. The cap 13 has a central bore about which is secured an open ended probe 14, carrying a diaphragm 15 to be subjected to the internal pressure of vessel 11.

A strain gage 16 is secured to one surface of diaphragm 15 so that as the diaphragm is flexed by variations of the internal pressure of vessel 11, the gage is subjected to compression or tension depending upon the direction of flexure. In the embodiment shown in the drawing gage 16 is connected to the outer surface of diaphragm 15, so that when the internal pressure in vessel 11 increases the diaphragm bows outwardly thereby subjecting the gage to tension to increase the resistance of the gage. It is to be understood, however, that this is but one preferred embodiment and the gage may be affixed to either surface of the diaphragm provided that the compensating resistors described herein are positioned in appropriate legs of the bridge 17.

The strain gage is electrically disposed in leg C—D of the Wheatstone bridge arrangement indicated generally at 17. In the schematic representation, the adjustable resistors 12 in legs A—B, A—C, and B—D of the bridge are shown only as variable resistance elements. However, they are so shown merely for the purposes of illustration, it being understood that in an actual device it would be desirable for the bridge to be formed of a plurality of strain gages each secured to the appropriate face of diaphragm 15 in order to increase the sensitivity of the device.

Conventionally, a temperature variable resistor 20 is connected to the strain gage and is subjected to the same temperature as the gage so that the gage provides a true indication of pressure within the vessel 11 regardless of the temperature at the diaphragm 15. A galvanometer 18 is connected across points C and B of the bridge 17 while the input from source 19 is connected across points A and D so that when the bridge is initially balanced by altering the value of the resistors 12, the meter 18 indicates a zero reading but if the resistance of leg C—D varies, the value of resistances 12 remaining constant, current will flow between points B and C thereby indicating that diaphragm 15 is being flexed. The direction of this current indicates the direction of change of the resistance in leg C—D which, of course, is a function of the internal pressure within vessel 11.

In a vessel having a capacity of 1250 cubic centimeters and filled with air, at 10.7 p.s.i. and 80° F., it was found that an increase of 3° F. causes an increase of 0.101 p.s.i. within the container. On the other hand, a leak of one cubic centimeter of air from the container causes a pressure change of only 0.015 p.s.i. under similar conditions. It should be apparent, therefore, that if the temperature within the vessel is increased only a few degrees the leaking of several cubic centimeters of fluid from the container will be more than compensated for by this increase, and a faulty pressure vessel would go undetected.

However, by connecting a thermistor 21 in series with the strain gage resistor 16 and physically positioning it within the pressure vessel, it is possible to cancel out any indicated variations in pressure which are caused by a temperature variation within the vessel. This thermistor should preferably have an extremely short temperature response so that the time lag between its temperature and that of the surrounding air is very short. By thus incorporating a second temperature dependent resistor in the circuit, it is possible to obtain a weighted pressure indication which is a measure of the change in the amount of fluid present within the vessel and is in no way dependent upon the pressure variations induced by changes in temperature. If the temperature within vessel 11 increases, thereby increasing the pressure therein; the electrical resistance of thermistor 21 varies in a manner to compensate exactly for the change in the value of the resistance of the strain gage 16 caused by the temperature induced variations in pressure. The thermistor functions in a similar manner to compensate for a decrease in temperature within vessel 11. Of course, the resistance in leg B—D must initially be increased to counter-balance the added resistance of leg C—D caused by the inclusion of the thermistor. It has been found necessary in using certain types of thermistors to shunt a second resistor indicated at 22 across the thermistor so that resistance across its terminals will vary in the precise manner required to exactly counterbalance the pressure effect on the diaphragm 15 caused by variations in temperature. The inclusion or exclusion of resistor 22 depends upon the particular components selected for the circuit and if the components are properly selected it may be omitted.

Although this invention has been described with reference to but one preferred embodiment thereof, it should be apparent to those skilled in the art, after understanding the invention, that it is not so limited and many modifications and variations may be made without departing from the spirit and scope thereof. Accordingly, the specification should be construed as illustrative only and the extent of this invention is to be determined by the scope of the appended claims.

What is claimed as new and desired to be secured by Letters Patent of the United States is:

1. A leak tester for determining pressure changes induced by variations in the amount of fluid within the interior of a closed, fluid containing vessel which comprises: a diaphragm connected to said vessel and adapted to be flexed by changes in the fluid pressure therein, a plurality of resistance elements connected in a balanced bridge circuit, at least one of the arms of said bridge circuit including a strain gage secured to one surface of said diaphragm whereby the flexure of said diaphragm alters the resistance of said strain gage to unbalance said bridge circuit and thereby indicating pressure changes within said vessel, and a temperature sensitive resistor having a negative temperature coefficient disposed within said vessel and serially connected with said strain gage in said one arm of the bridge circuit in such a manner as to compensate for variations in the resistance of said elements resulting solely from variations in the temperature of the fluid.

2. A leak tester for indicating pressure changes within a closed vessel induced by changes in the amount of fluid within the vessel comprising: an open-ended probe fixed to said vessel, a diaphragm disposed within said probe in communication with the fluid within the vessel and operated upon by the fluid, an electrical resistance element possessing a value of resistance dependent upon the amount and type of stress to which it is subjected, said element being secured to said diaphragm and adapted to be stressed in compression in response to a decrease in fluid pressure and in tension in response to an increase in fluid pressure acting upon said diaphragm, a resistor having a negative temperature coefficient connected in series with said element and disposed in said vessel whereby the change in resistance of said element caused by temperature induced pressure changes is compensated for by an opposite change in resistance of said resistor, and means electrically connected to said resistance element and said resistor to measure the value of the total electrical resistance of said resistance element and said resistor.

3. The leak tester of claim 2 further comprising: a balancing resistor connected in shunting relation to said first resistor to assure that the variations in said first resistor caused by variations in temperature are exactly equal and opposite to the changes in resistance of said electrical resistance element caused by stressing of said element in response to temperature initiated pressure variations.

4. In a device for measuring the leakage of a closed fluid containing system including a resistance bridge circuit, a strain gage responsive to variations of pressure within the system electrically disposed in a first leg of the circuit to cause unbalance of the bridge circuit in response to pressure variations in the system, and means to measure the unbalance in said circuit, the improvement which comprises: a thermistor disposed in the first leg of said circuit and serially connected with said strain gage, said thermistor being disposed within the system being measured to cancel the effects upon said strain gage of pressure variations caused by temperature changes within said system.

References Cited in the file of this patent

UNITED STATES PATENTS

| | | |
|---|---|---|
| 2,021,774 | Gilmore | Nov. 15, 1935 |
| 2,488,347 | Thurston | Nov. 15, 1949 |
| 2,658,819 | Formwalt | Nov. 10, 1953 |
| 2,879,663 | Thomas | Mar. 31, 1959 |

OTHER REFERENCES

"Electronic Fundamentals and Applications," by John D. Ryder, published 1950 by Prentice-Hall, pages 784–787.

Review of Scientific Instruments, No. 9, vol. 29, page 793, September 1958.